Figure 1:
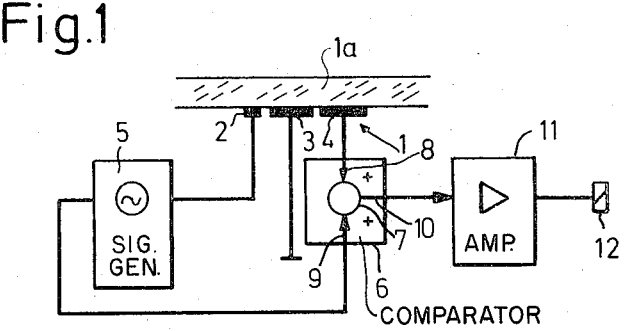

United States Patent [19]

Steinmann

[11] 3,826,979
[45] July 30, 1974

[54] CAPACITIVE DETECTOR DEVICE
[75] Inventor: Helmut Steinmann, Baden-Baden, Germany
[73] Assignee: Robert Bosch GmbH, Stuttgart, Germany
[22] Filed: June 18, 1973
[21] Appl. No.: 370,963

[30] Foreign Application Priority Data
Aug. 10, 1972  Germany............................ 2239359

[52] U.S. Cl............. 324/61 R, 200/61.05, 318/483, 324/61 P
[51] Int. Cl............................................ G01r 27/26
[58] Field of Search ...... 324/61 P, 61 R; 200/61.05, 200/61.04; 15/150.12, 250 C; 318/483, 443

[56] References Cited
UNITED STATES PATENTS

| | | | |
|---|---|---|---|
| 2,435,880 | 2/1948 | Eilenberger | 324/61 P |
| 2,950,436 | 8/1960 | Buttecaz et al. | 324/61 P |
| 3,043,993 | 7/1962 | Maltby | 324/61 P |

FOREIGN PATENTS OR APPLICATIONS

| | | | |
|---|---|---|---|
| 1,063,515 | 3/1967 | Great Britain | 324/61 P |
| 1,808,521 | 6/1970 | Germany | 15/250.42 |
| 1,149,650 | 4/1969 | Great Britain | 324/61 P |
| 19,050 | 9/1963 | Japan | 324/61 P |

Primary Examiner—Stanley T. Krawczewicz
Attorney, Agent, or Firm—Flynn & Frishauf

[57] ABSTRACT

A stray field capacitor with three plates edge to edge in a row has its center plate grounded, and normally most of the stray field of a signal applied to one of the end plates is between that end plate and the center plate which shields the other end plate. A reverse phase signal of proper amplitude may be used to reduce to zero the quiescent output of a receiver attached to the other end plate of the capacitor. If the capacitor plates are mounted on the inside of the windshield of a motor vehicle, the receiver will switch on the windshield wipers when moisture collects on the windshield.

8 Claims, 5 Drawing Figures

PATENTED JUL 30 1974      3,826,979

CAPACITIVE DETECTOR DEVICE

This invention relates to a capacitive detector device, particularly to such a device for operating a switch in response to the presence of moisture in the neighborhood of the device. More particularly, the invention concerns such a device in a form for automatically switching on and off the windshield wipers of a motor vehicle.

Moisture sensitive switches of various kinds have been used for many purposes, including the automatic turning on of the windshield wiper of a motor vehicle as soon as a small amount of moisture is precipitated on the windshield, even in the case of mist or a light drizzle of rain. Known installations of this kind involve the application of two electrodes to the outside of the windshield which become conductively connected by drops of water that land on the surface between them. It has also already been proposed to provide a capacitor behind the windshield of the motor vehicle, so that its capacity will be modified by the moistening of the windshield.

Moisture sensitive switches with capacitive detectors have been developed for measuring the moisture content of materials such as paper, textile fibers or various kinds of food. Up to now, the effect utilized in such devices has been the increase of the capacitance of a capacitor when material with a greater dielectric constant than that of air is brought between the electrodes of the capacitor. In such devices operating with capacitor plates separated by a gap, a sufficiently large measuring value is obtained, but such arrangements are practical only when the material to be measured can be brought between the plates of the capacitor. Unfortunately that is not possible in all cases, so that stray field capacitors, sometimes referred to as fringing field capacitors, have been proposed, these being capacitors having two or more electrodes arranged next to each other in a plane and electrically connected in circuit as a pair, or two or more pairs. The disadvantage of known stray field capacitors for these measurements is that the smallest variations of the air gap between the material under measurement and the electrodes produces substantial changes of the measured value. Furthermore, the amplitude of measureable signals in such stray field capacitors is very small.

It is an object of this invention to provide a capacitive detector suitable for operating a switch that works with an operating signal of great amplitude, which has the smallest possible technical complication and manufacturing cost, and which is suitable for a wide range of applications.

SUBJECT MATTER OF THE PRESENT INVENTION

Briefly, a stray field capacitor is used comprising three electrodes arranged in adjacent sequence edge to edge, with the middle electrode connected to reference potential and thus serving as a shield electrode, while one of the end electrodes is connected with a signal generator and the other with a signal receiver. A signal that may be evaluated for measurement is then obtained from the signal receiver, the signal varying in response to changes in the pattern of the electric lines of force around the capacitor. For further advantage a reverse phase signal may be derived from the signal generator and applied to the signal receiver in a balancing circuit at the proper amplitude to result in zero output of the signal receiver during normal conditions, so that the presence of any signal output will then indicate a change of the pattern of the lines of force from the normal pattern.

The invention will be described by way of example with reference to the accompanying drawings, wherein:

FIG. 1 is a block diagram of a capacitive detector arranged to operate a switch in accordance with the invention, and FIGS. 2, 3, 4 and 5 are diagrams for explaining the effect utilized in the capacitive detector of the invention.

The capacitive detector 1 shown in FIG. 1 is a stray field capacitor with three electrodes 2, 3 and 4, mounted edge to edge, in this case on a pane of glass 1a. The electrode 2 at one end of the array has an electric signal applied to it by a signal generator 5. The signal is preferably an alternating sinusoidal signal in the low KHz frequency region with a peak-to-peak value of about 15 volts. The middle electrode is connected with the reference potential of the circuit, preferably with the vehicle chassis, or in the case of a stationary installation, with ground. A signal receiver 6 is connected to the electrode 4 at the other end of the array for evaluation of the signal picked off from the electrode 4. The signal receiver 6 contains a balancing circuit 7, which is one form of an addition circuit, having two inputs 8 and 9 and an output 10 connected to an amplifier 11 which controls a relay 12. The input 8 of the balancing circuit 7 is connected electrically to the electrode 4, whereas a comparison voltage is applied to the other input 9 of the balancing circuit 7. The comparison voltage is an output of the signal generator 5 which is shifted by 180° in phase (i.e., reverse phase) relative to the main output of the signal generator 5 which is applied to the electrode 2.

Figure 2:
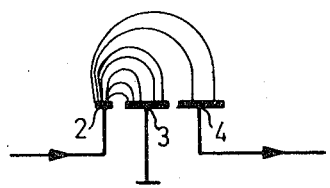
Figure 3:
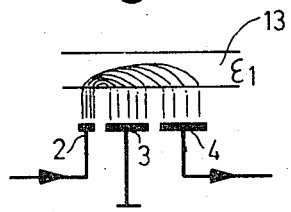

The manner of operation of the circuit shown in FIG. 1 is explained with reference to FIGS. 2 and 3. The electrode 2 is provided as a very narrow strip electrode in order to produce a high field strength. If a signal from the signal generator is applied to it, an electric field is produced, the lines of force of which are represented by the curved lines in FIG. 2. This field is produced mainly between the transmitting electrode 2 and the shield electrode 3, and only a relatively small portion of the stray field reaches the receiving electrode 4. If now, as represented in FIG. 3, there is brought into the region of the electric field a body 13, whose dielectric constant $\epsilon_1$ is much greater than the dielectric constant of the medium between the electrodes and this body, the effect arises that a greater proportion of the field reaches the receiving electrode 4. This happens because the high dielectric constant $\epsilon_1$ of the body 13 prevents any great potential differences from being present on the body 13, so that the potential induced on this body by the transmitting electrode 2 now begins to affect the receiving electrode 4 as well as the shield electrode 3. A signal can now be taken from the receiving electrode 4 of an amplitude proportional to the modification of the electric field. This received signal is applied to the input 8 of the balancing circuit 7.

The transmitted signal, shifted 180° in phase, is applied to the input 9 of this balancing circuit, with its amplitude adjusted to bring the resultant signal at the output 10 of the balancing circuit to zero when the electric field in front of the electrodes is uninfluenced by any disturbances. Any change in the pattern of lines of force of the field will then produce a signal at the output 10 that will be amplified in the amplifier 11, so that it will be suitable for operating a relay 12.

Figure 4:
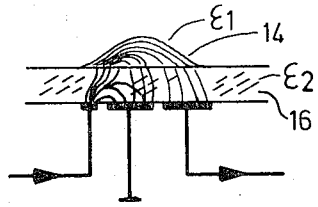

This circuit can be utilized to set in motion a windshield wiper when moisture is precipitated on the windshield of a motor vehicle. As shown in FIG. 4, the electrodes 2, 3 and 4 are mounted on the inside of the windshield 16. They are preferably mounted in a region which is swept by the windshield wiper. The type of glass normally used for the manufacture of windshields has a dielectric constant $\epsilon 2$ of the order of 8. A water drop 14 striking the windshield ($\epsilon 1 \approx 80$) will modify the pattern of lines of force in the neighborhood of the electrodes as above described, so that the receive signal operates the relay which sets the windshield wiper into operation by means of an electric motor.

Figure 5:
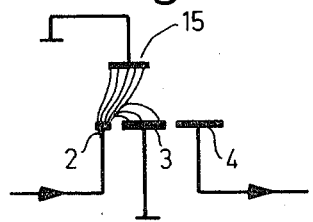

The capacitive detector device of the present invention can likewise be used as a noncontact proximity detector. As shown in FIG. 5, if a fourth electrode 15 connected to reference potential is brought into the electric field which originally has the form shown in FIG. 2, the lines of force of the stray field which originally reached the receiving electrode 4 are pulled over to this electrode 15. The amplitude of the signal produced at the receiving electrode 4 then drops off and this detection effect can be used to control any desired utilization apparatus, for example, a positioning motor.

Compared to known devices, particularly those utilizing stray field capacitors with two electrodes, the capacitive detector of this invention produces an output signal of much greater amplitude, which is easier to evaluate and can be handled with much simpler electronic equipment. It should further be noted that the individual components of the capacitive detector, including its balancing circuit, amplifier and switch are very simple to manufacture. A further consequence of these advantages is that because of the large output signal, the operating frequency can be kept relatively low. The device of this invention is accordingly widely applicable and is especially well suited for automatic control of the motor of a windshield wiper unit.

Although the invention has been described with respect to a particular embodiment, it will be understood that modifications may be made within the inventive concept without departing from the spirit of the invention.

I claim:

1. A capacitive detector device comprising:
   a stray field capacitor (1) having three electrodes disposed edge to edge in adjacent sequence on a continuous surface of no great curvature, said electrodes being thin in the direction perpendicular to said surface, the middle electrode (3) being connected to a steady reference potential and thereby serving to shield one end electrode from the other;

signal generating means (5) connected to a first end electrode (2) of said three electrodes, and
   signal receiving means (6) connected to the second end electrode (4) for detecting increased transmission from said signal generating means (5) as the result of changes in the configuration of the electric field in the neighborhood of said capacitor, said second electrode having a dimension in the direction of sequence of said electrodes which is large compared to the spacing between adjacent electrodes.

2. A capacitive detector device as defined in claim 1, in which said surface is a plane surface.

3. A capacitive detector device as defined in claim 1, in which said first end electrode (2) has the form of a narrow strip electrode with its narrow dimension being the dimension more nearly aligned with the direction of sequence of said electrodes.

4. A capacitive detector device as defined in claim 1, in which said signal generating means generates low frequency sinusoidal electric waves.

5. A capacitive detector device as defined in claim 4, in which said signal receiving means (6) is provided with a balancing means (7) in which a reverse phase signal from said signal generating means is applied to said balancing means (7) at such an amplitude as to balance out and cancel the signal received by said receiving means (6) through the field of said capacitor during normal conditions, so that said balancing means (7) will provide a signal only during abnormal conditions which it is desired to detect.

6. A capacitive detector device as defined in claim 1, in which said electrodes are mounted near the exterior surface of a motor vehicle and the output of said receiver is used to activate or disable a windshield wiper, according to the presence or absence of moisture on an outer surface of said motor vehicle.

7. A capacitive detector device as defined in claim 6, in which said electrodes are disposed on the inner surface of the windshield of said motor vehicle.

8. A capacitive detector device as defined in claim 6, in which said electrodes are mounted at a position on the inner surface of the windshield of a motor vehicle opposite a portion of the surface of the windshield of said motor vehicle which is swept by windshield wipers.

* * * * *